United States Patent [19]

Harley

[11] Patent Number: 5,145,302
[45] Date of Patent: Sep. 8, 1992

[54] SCREWS

[75] Inventor: David N. Harley, Dorset, England

[73] Assignee: Titus Tool Company Limited, Buckinghamshire, England

[21] Appl. No.: 704,253

[22] Filed: May 22, 1991

[30] Foreign Application Priority Data

Jun. 5, 1990 [GB] United Kingdom ............... 9012540

[51] Int. Cl.$^5$ .......................................... F16B 23/00
[52] U.S. Cl. .................................................. 411/404
[58] Field of Search ............... 411/402, 403, 404, 405, 411/406, 407, 410, 919

[56] References Cited

U.S. PATENT DOCUMENTS

| 2,331,608 | 10/1943 | Hathorn | 411/403 X |
| 2,556,155 | 6/1951 | Stellin | 411/410 |
| 2,800,829 | 7/1957 | West | 411/404 |
| 3,204,266 | 9/1965 | Carter, Jr. et al. | 411/403 X |
| 3,269,250 | 8/1966 | Curtiss | 411/410 |

FOREIGN PATENT DOCUMENTS

| 0112030 | 9/1983 | European Pat. Off. | 411/403 |
| 1006509 | 10/1965 | United Kingdom | 411/403 |
| 2092253 | 8/1982 | United Kingdom | 411/403 |

Primary Examiner—Rodney M. Lindsey
Attorney, Agent, or Firm—Lowe, Price, LeBlanc & Becker

[57] ABSTRACT

An angle-drive screw is provided which has a screwdriver recess in its head, the side-walls of the recess being undercut by the provision of a number of bores extending transversely through the screw head and connecting with the screwdriver recess. The screw may be formed by a casting or moulding process.

10 Claims, 4 Drawing Sheets

PRIOR ART

SCREWS

FIELD OF THE INVENTION

This invention relates to screws, and in particular to the type of screws which are designed to be driven by a screwdriver positioned at an angle to the screw axis.

BACKGROUND OF THE PRIOR ART

Screws of this type are well-known and are generally referred to as "angle-drive" screws. As is known, these screws have substantial advantages, arising from the fact that they can be used in situations where ordinary screws would be inaccessible with a conventional screwdriver, such as in a surface very close to an internal corner.

The known types of angle-drive screws are generally of the cross-head type, the screwdriver recess being shaped to allow the tip of a cross-head screwdriver such as those known by the trade name "Phillips" or "Pozidriv" to enter the recess at a relatively large angle, of the order of 20° or 30°. To prevent the tip of the screwdriver from lifting out of the recess whilst the screw is being driven, the walls of the recess are formed with undercuts.

In the prior art several different methods are known for forming angle-drive screws with these desired characteristics.

A first method is described in GB 2129348 which discloses a two-stage process for making angle-drive screws. The first step comprises the formation of a die-cast or moulded screw blank having a domed head formed with a generally cross-shaped screwdriver recess in its end surface. The screw blank is subsequently subjected to an axially-directed impact or squeezing force applied to its domed end, which acts to flatten the end surface of the screw head. As the upstanding segments between the arm portions of the cross-shaped recess are compressed into the recess they form overhangs resulting in undercuts in the recess walls.

FIG. 1a shows a section through an example of a screw blank of this type, and FIG. 1b illustrates the resulting finished screw after the compression force has been applied. As can be seen from these Figures the bottom surface of the recess curves upwardly from the axial centre towards the circumference of the screw head. The resulting cupped shape provides extra depth for insertion of the tip of a screwdriver when driving the screw, which is advantageous.

Although providing a screw which functions satisfactorily the two-stage process described is an expensive manufacturing technique because of the secondary processing required to apply the axial compression force. Screws produced by this method are therefore relatively costly.

European Patent 0112030 describes an alternative method for manufacturing angle-drive screws which does not require the secondary action described above. This document discloses a one-stage moulding or casting process in which two main mould-parts define the screw cavity and are arranged to be separable along a plane including the screw axis. In known fashion the screw is removed by separation of the mould parts. One of the mould-parts is provided with a blade portion which extends in a direction perpendicular to the plane of separation of the mould-parts to form an enlarged recess in the head of the finished screw, the recess extending transversely of the head and opening in a slot at its periphery. At the same time a further mould-part is arranged to be retractable in an axial direction from the head of the screw. This mould part is arranged to form the cross-shaped opening in the end surface of the head, this recess connecting with the enlarged transverse recess below. The finished screw is consequently formed with a cross-shaped opening in the end surface of the screw head and an enlarged recess underneath it so that the walls of the recess are effectively undercut.

Angle-drive screws produced by this method are cheaper than those made by the previously described two-stage process. However, they do have some disadvantages associated with the method of manufacture and the use of the blade-shaped mould-portion to form the enlarged recess in the head. Firstly, the resulting slot formed in the side of the head is relatively large and gives rise to weak points which may lead to fractures in the screw head during use. Also, because the blade must be withdrawn through the slot at the end of the moulding process it cannot be used to form a curved bottom surface in the recess, as described in relation to the screw formed by the two-stage process outlined above. The recess therefore does not have the extra depth for insertion of the screwdriver tip provided by the cupped shape.

An example of the second type of prior art angle-drive screw is shown in FIGS. 2a and 2b. FIG. 2a is a plan view of the end of the screw head and FIG. 2b is a sectional view along the line B—B' shown in FIG. 2a.

SUMMARY OF THE INVENTION

According to a first aspect of the invention there is provided an angle-drive screw having a head provided with a generally cross-shaped screwdriver recess, the side-walls of the recess being provided with undercuts by means of a plurality of bores extending transversely through the screw head and connecting with said recess.

According to a second aspect of the invention there is provided an angle-drive screw having a head provided with a generally cross-shaped recess defined by a bottom surface and side-walls on four segments of the head, which segments extend towards the screw axis, the side walls being undercut by means of four bores, each bore extending inwardly from the periphery of the head and opening into the recess in both side-walls on a respective segment so as to undercut both of those side-walls.

According to another aspect of the invention there is provided a method of making an angle-drive screw comprising moulding or casting suitable material in a cavity defined by two main mould-parts arranged to meet in a plane including the screw axis, the mould including a retractable mould portion arranged to move up to and away from the screw head in an axial direction to form a screwdriver recess therein, and each of said mould-parts being provided with at least one bore-forming mould portion extending laterally into the cavity to meet said retractatle mould portion thereby forming undercuts in the walls of the screwdriver recess.

The provision of the undercut configuration by means of a plurality of bores from different sides of the screw head means that each bore opening in the screw head periphery can be made relatively small. The disadvantages associated with the large slot of the prior art device made in a one-stage casting operation described hereinbefore are thus avoided, as there is a greatly reduced likelihood of weaknesses in the screw head which could lead to fracturing.

BRIEF DESCRIPTION OF THE DRAWINGS

In order that the invention may be better understood an embodiment thereof will be described, by way of example, with reference to FIGS. 3 to 7 of the accompanying diagrammatic drawings, wherein.

BRIEF DESCRIPTION OF THE PREFERRED EMBODIMENTS

Figure 1A:
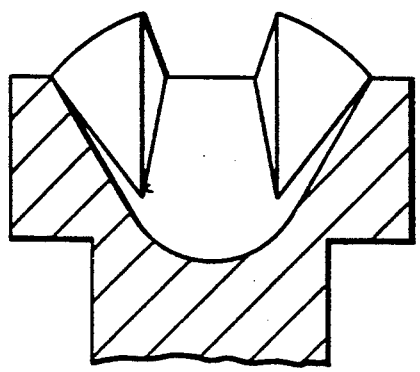
FIGS. 1a, 1b, 2a, 2b illustrate screws known in the prior art.
Figure 1B:
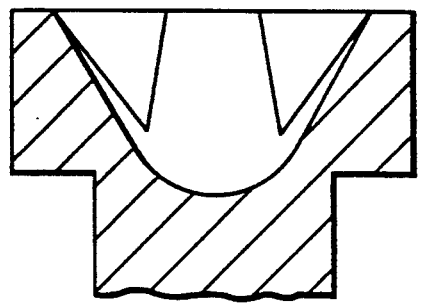
Figure 2A:
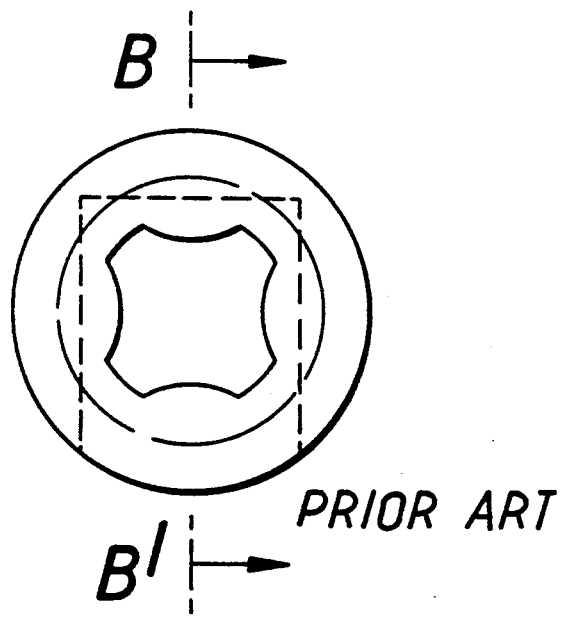
Figure 2B:
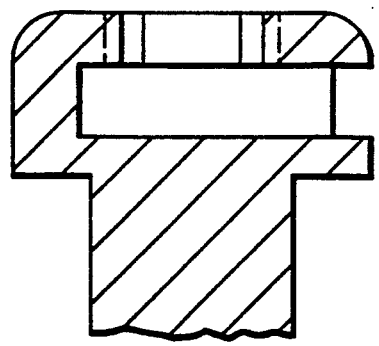
Figure 3:
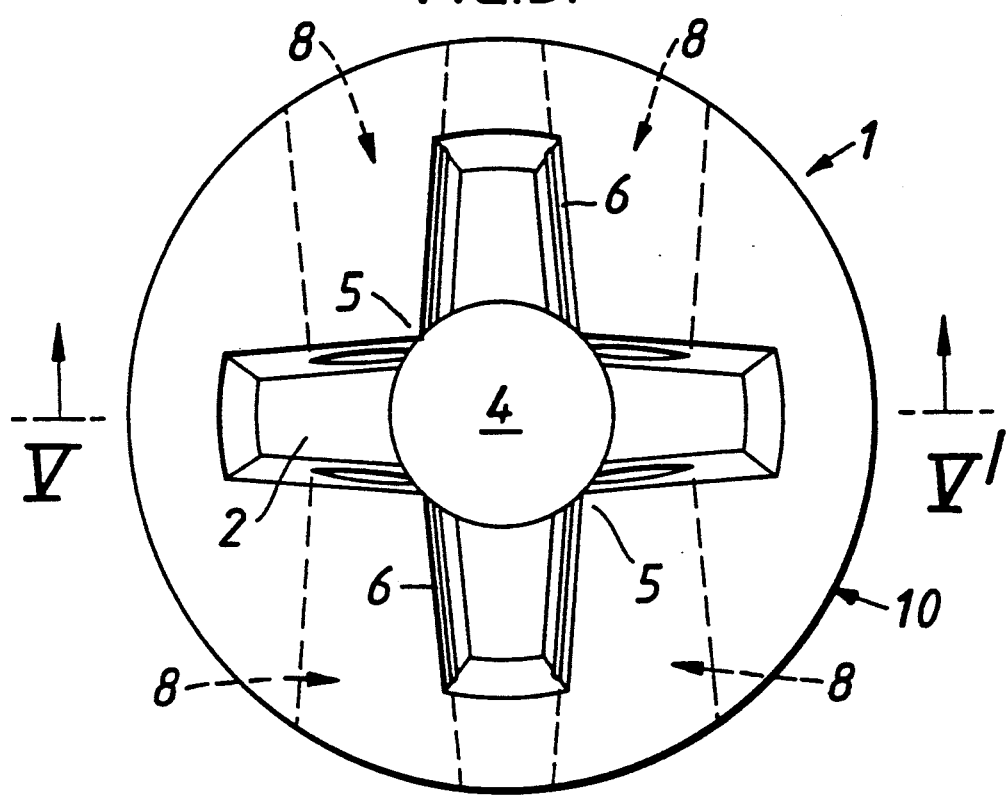
FIG. 3 is a plan view of an angle-drive screw according to the invention.
Figure 4:
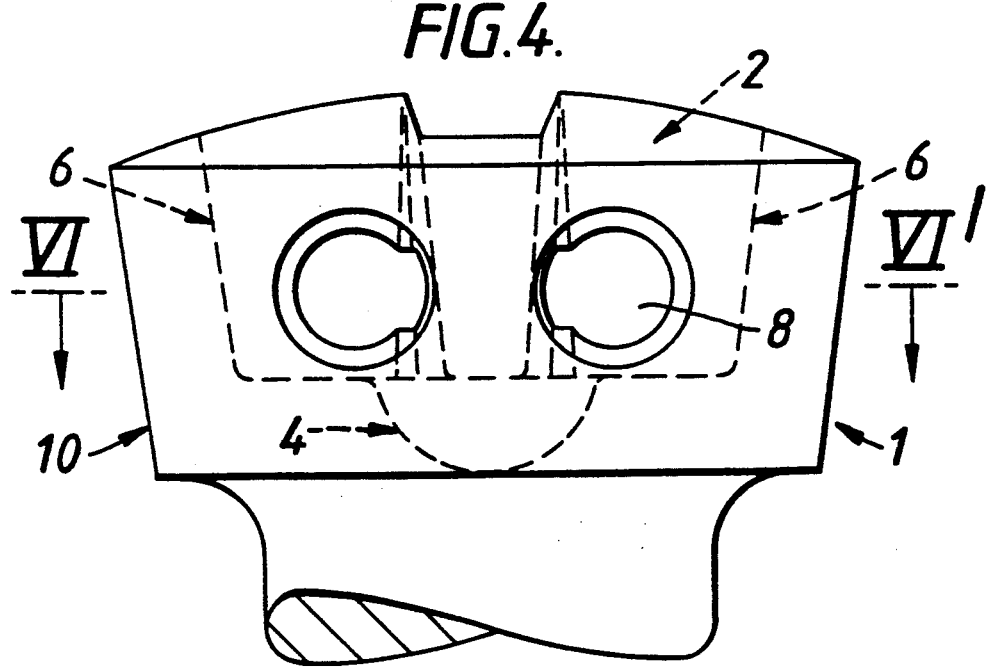
FIG. 4 is a side view of the angle-drive screw of FIG. 3.
Figure 5:
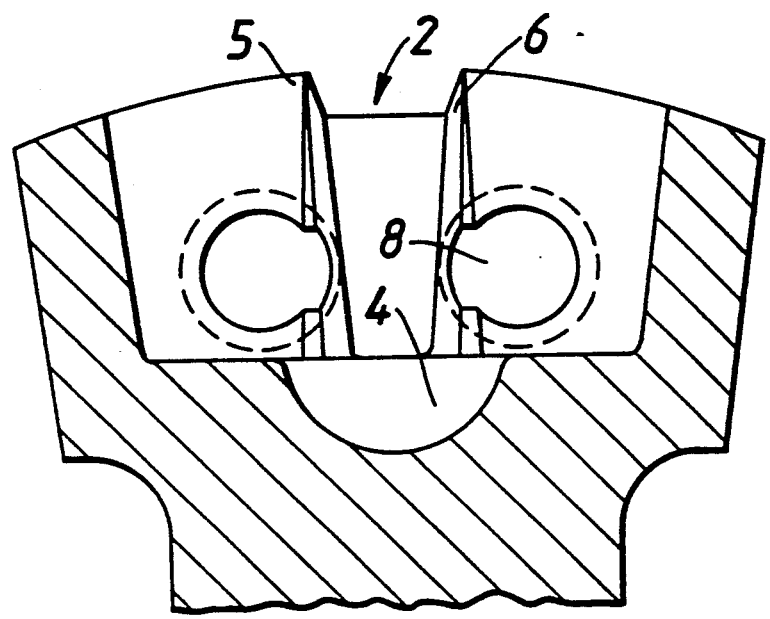
FIG. 5 is a sectional view along the line V—V' in FIG. 3.
Figure 6:
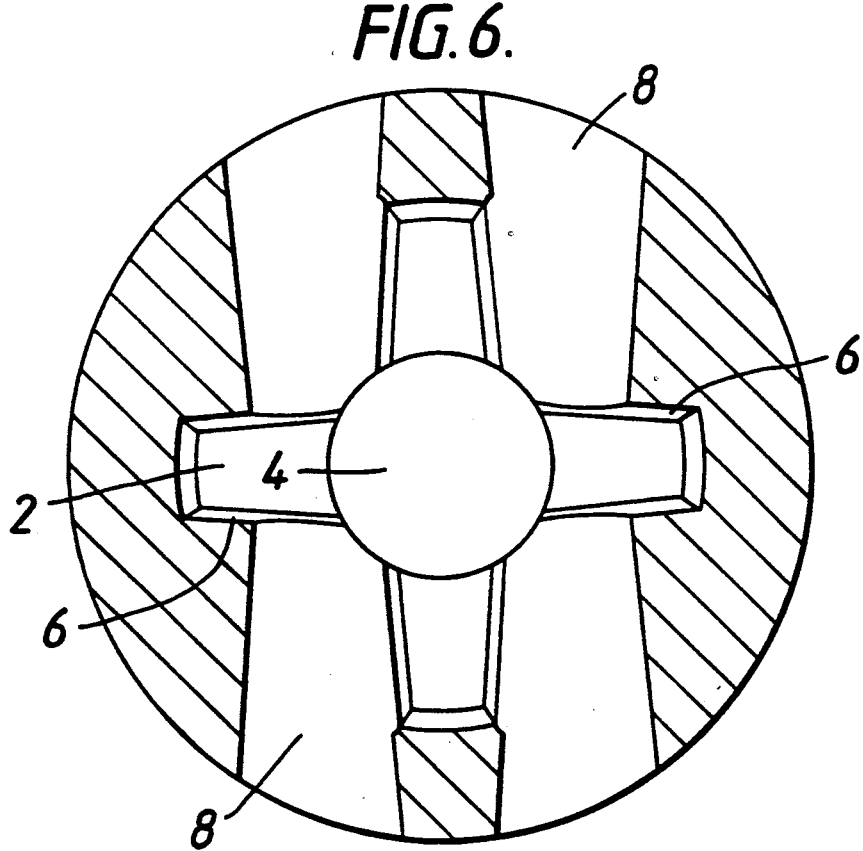
FIG. 6 is a sectional view along the line VI—VI' in FIG. 4.

As shown in FIGS. 3 to 6 an angle-drive screw 1 is formed with a generally cross-shaped recess 2 in the end surface of the screw head. The recess 2 is defined by a bottom surface 4 and walls 6 which are arranged to form segments 5 extending towards the screw axis. The walls 6 lie in planes substantially parallel to the screw axis, but may be arranged to taper slightly outwardly towards the top of the screw head to facilitate the moulding process by which the screw is formed. The bottom surface 4 curves upwardly from the axial centre forming a cupped central portion in the recess 2, allowing greater depth for penetration of the tip of the screwdriver into the screw head during operation.

As known in the prior art, the recess 2 is relatively wide and deep to enable a screwdriver to be inserted at a large angle, of the order of 30°, to the screw axis.

In the illustrated embodiment, four bores 8 extend transversely of the head from respective openings in the periphery in a plane substantially perpendicular to the screw axis. Although the bores are shown to have circular cross-sections, it will be appreciated that any other suitable cross-sections may be used. The bores 8 are arranged in opposed pairs, the ends of the bores connecting with the recess 2 by opening into respectively opposed walls 6 of the recess. The diameter of each bore 8 increases gradually towards the periphery of the screw head to facilitate the moulding process to be described below.

Additionally, each bore 8 is positioned so that it opens into an adjacent one of the walls 6 along a substantial part of its length extending from its inner end toward the periphery of the screw head. Thus, each bore 8 extends underneath a respective one of the segments 5, connecting with the recess 2 on both sides of the segment 5 so that the segment is undercut, affording means by which a screwdriver positioned at an angle to the screw axis can be retained in the recess whilst being used to drive the screw.

The screw may be manufactured in a conventional one-step casting or moulding process. A suitable material for the screw is a zinc alloy such as the one known by the trade name "Mazak" or "Zamag".

Two main dies or mould-parts define the cavity in which the screw is formed. In known fashion the mould parts are arranged to meet, and be separable, in a plane which includes the screw axis. The finished screw is removed from the mould by separating the mould-parts.

To form the angle-drive screw of the preferred embodiment each of the main mould-parts is provided with two fixed, slightly tapered rods or dowels which extend perpendicular to the plane of separation of the mould-parts. These are arranged to form the bores 8 in the screw head, two from each side.

In addition the mould is provided with a retractable male mould-part which moves in an axial direction up to and away from the screw head. This mould-part forms the recess 2 including the cupped bottom surface 4.

In the method described above the bores are formed by tapered dowels. According to the tooling adopted these dowels may actually contact the retractable mould part used to form the cross-shaped recess, or alternatively a very small gap may be left between the mould parts giving rise to very thin wafers of the material of the screw across the openings in the recess of the finished screw. These are broken away by a screwdriver inserted in the screw head when the screw is to be used for the first time and for all practical purposes the undercuts are therefore formed when the screw is moulded.

As will be apparent, there are many variations and modifications which may be made to the foregoing example and it is intended that these should be included within the scope of the invention. For example, the shape of the opening of the recess in the top surface of the screw head may be adapted to cooperate with different shaped screwdriver tips.

Figure 7:
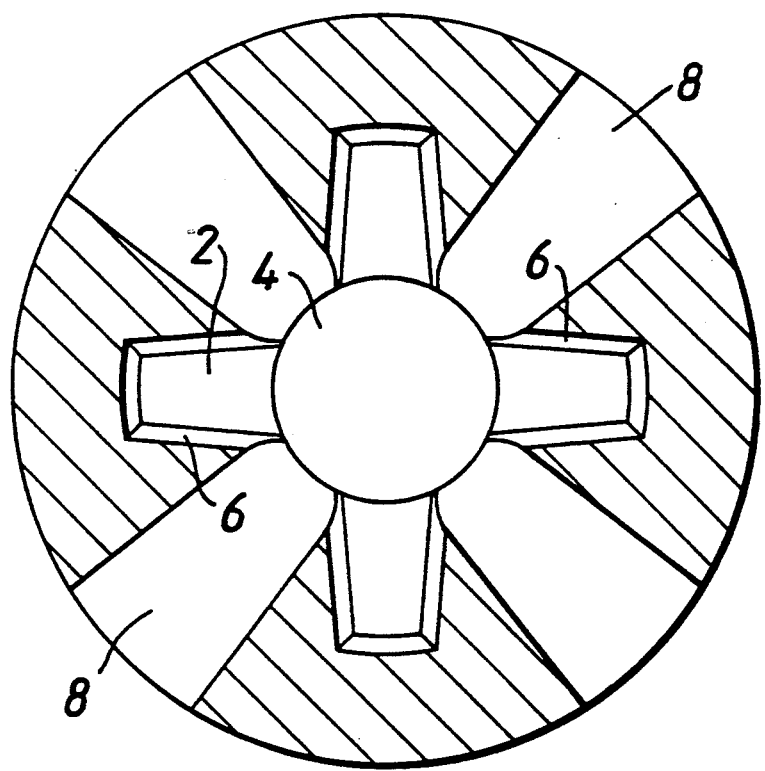
FIG. 7 is a sectional view similar to that of the FIG. 6 showing an alternative embodiment of an angle-drive screw according to the invention.

Furthermore, the configuration of the bores in the head is not limited to that of two opposed pairs as described, and any suitable arrangement may be adopted. For instance, in a cross-headed screw similar to that described undercuts may be provided by four bores arranged at right angles to one another and directed towards the axial centre of the screwhead at approximately 45° to each arm of the cross-shaped recess. FIG. 7 shows an example of such an arrangement. In making this screw the four bores could be formed using retractable mould parts.

Also, although in the described embodiment the bottom surface 4 of the recess 2 is shown to comprise a hemispherical hollow, it is envisaged that this surface may be wider, sloping up to the end walls of the cross-shaped recess 2 so that a larger recess 2 is formed below the level of the bores 8.

Finally, the screw may be made of any suitable metal, plastics or other material which can be moulded or cast.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

I claim:

1. An angle-drive screw having a head provided with a generally cross-shaped screwdriver recess, the sidewalls of the recess being provided with undercuts by means of a plurality of bores extending transversely through the screw head and connecting with said recess.

2. An angle-drive screw according to claim 1 wherein each bore opens at the periphery of the screw head and extends inwardly therefrom in a plane substantially perpendicular to the screw axis.

3. An angle-drive screw according to claim 1 wherein each bore terminates in an opening into the recess in a side wall of said recess and is additionally open into the recess along a substantial part of its length from said opening towards the periphery of the screw head.

4. An angle-drive screw according to claim 1 wherein the screwdriver recess is generally cross-shaped and the screw is provided with four bores.

5. An angle-drive screw according to claim 4 wherein the four bores are arranged in opposed pairs generally parallel to one another, and said pairs extend substantially parallel to a first opposed pair of arms of the cross-shaped recess.

6. An angle-drive screw according to claim 4 wherein the four bores are arranged in opposed pairs generally perpendicular to one another and said pairs extend at approximately 45° to the arms of the cross-shaped recess.

7. An angle-drive screw according to claim 1 wherein the diameter of each bore tapers outwardly towards the periphery of the screw head.

8. An angle-drive screw according to claim 1 wherein the bottom surface of the screwdriver recess curves upwardly from the axial centre of the screw towards the screw head periphery.

9. An angle-drive screw having a head provided with a generally cross-shaped recess defined by a bottom surface and side-walls on four segments of the head, which segments extend towards the screw axis, the side walls being undercut by means of four bores, each bore extending inwardly from the periphery of the head and opening into the recess in both side-walls on a respective segment so as to undercut both of those side-walls.

10. An angle-drive screw according to claim 1 formed by casting or moulding.

* * * * *